Patented Dec. 3, 1940

2,224,003

UNITED STATES PATENT OFFICE 2,224,003

CRACKING OR PRESSURE HYDROGENATION OF HYDROCARBONS

Mathias Pier, Heidelberg, and Walter Simon, Ludwigshafen-on-the-Rhine, Germany, assignors, by mesne assignments, to William E. Currie, New York, N. Y.

No Drawing. Application March 24, 1939, Serial No. 263,908. In Germany April 1, 1938

4 Claims. (Cl. 196—50)

The present invention relates to the cracking or pressure hydrogenation of hydrocarbons.

We have found that in the cracking and/or pressure hydrogenation of hydrocarbons rich in hydrogen which contain more than 15 grams of hydrogen per 100 grams of carbon, as for example hydrocarbons obtained by the reduction of carbon monoxide or other corresponding hydrocarbons rich in hydrogen, high yields of benzine, or under less strongly cracking conditions, of Diesel oil rich in hydrogen can be obtained and the formation of large amounts of gaseous hydrocarbons otherwise occurring in the cracking or destructive hydrogenation of hydrocarbons rich in hydrogen can be avoided, by using for the cracking or pressure hydrogenation catalysts known to be highly active, the activity of which has been considerably weakened by use in the pressure hydrogenation of carbonaceous substances poor in hydrogen in the liquid or, preferably, in the gaseous phase, in the latter case with the oil vapors above the usual pressure, preferably above 10 atmospheres, the total pressure being about 200 atmospheres, or more, a temperature about 50° to 100° C. above the optimum temperature for cracking or pressure hydrogenation and/or by use for a long time.

As highly active catalysts for the said weakening pre-treatment there may be mentioned, especially for cracking, in particular substances containing silicic acid, preferably those simultaneously containing alumina, as for example natural aluminum hydrosilicates, such as bleaching earths or artificially produced substances of a similar kind. Highly active catalysts for the pretreatment pressure hydrogenation are in particular heavy metal sulphides, especially the sulphides of metals of the 5th and 6th groups of the periodic system or the iron group, or also the oxides of metals of the 5th to the 7th groups of mixtures of these substances.

The highly active catalysts are for example first used for a destructive or refining pressure hydrogenation of initial materials poor in hydrogen, such as tars, tar oils, asphalt-basic or mixed basic crude oils or their high boiling fractions or high boiling point pressure hydrogenation or extraction products of coals or peat in the liquid phase, at least for several hours or better for several days or even for longer periods. A decrease in the activity of the catalyst should thus take place without the deposition of asphalt on the catalyst.

Before using the catalysts for the substances rich in hydrogen, they may also be used in the working up of substances poor in hydrogen, as for example tar middle oils, in the gas phase with a greater oil vapor partial pressure than is usual for pressure hydrogenation in the gas phase, preferably of more than 10 atmospheres, as for example 15 atmospheres or more. The oil vapor partial pressure is so related to the hydrogen content of the initial materials that initial materials richer in hydrogen are worked up at higher oil vapor partial pressure. When working up petroleum middle oils poor in hydrogen it preferably amounts to more than 20 atmospheres.

The catalyst is used in the said treatment of initial materials poor in hydrogen until its activity has been reduced to such an extent that even when the catalyst is used again for the cracking or pressure hydrogenation of other kinds of initial material it does not again attain its original value.

When the oil vapor partial pressure and the temperature in the pressure hydrogenation of initial materials poor in hydrogen is kept within the usual limits, a long period of use, for example six months or more, is necessary before the catalyst activity is so much reduced that the catalyst is used for the working up of substances rich in hydrogen in accordance with this invention.

The catalysts used in the treatment of substances poor in hydrogen are used for the cracking or pressure hydrogenation of substances rich in hydrogen, as for example middle oils or lubricating oils. Such catalysts are especially suitable for the cracking or hydrogenation of the hydrocarbons obtained by the reduction of carbon monoxide with hydrogen, as for example the so-called "Kogasine." Thus, with a small formation of gaseous hydrocarbons, benzines are obtained in a good yield, or when working under less strongly cracking conditions, in particular while simultaneously supplying hydrogen under pressure, good Diesel oils rich in hydrogen are obtained.

The following example will further illustrate how the present invention can be carried out in practice, but the invention is not restricted to this example.

Example

A coal tar oil boiling from about 200° to 400° C. is led at 410° C. together with hydrogen under a pressure of 200 atmospheres with a partial pressure of tar oil of 13 atmospheres over tungsten disulphide rigidly arranged in a reaction vessel for three days. The activity of the catalyst is thus reduced by about 25 per cent, which means that in order to obtain the original result the speed of the vapors and gases led through the vessel must be reduced by about 25 per cent. A fraction of a paraffinic hydrocarbon mixture boiling between 200° and 325° C. of an oil obtained by the reduction of carbon monoxide is then led over the same catalyst at the same temperature and at the same pressure. A product consisting to the extent of 70 per cent of benzine is obtained. Only 6 per cent of the initial material are converted into gaseous hydrocarbons.

What we claim is:

1. In the destructive treatment under pressure of hydrocarbons containing more than 15 grams of hydrogen per 100 grams of carbon, the employment of an initially highly active catalyst the activity of which has been reduced by its employment in a pressure hydrogenation treatment of carbonaceous substances poor in hydrogen.

2. In the cracking of hydrocarbons containing more than 15 grams of hydrogen per 100 grams of carbon, the employment of an initially highly active catalyst the activity of which has been reduced by its employment in a pressure hydrogenation treatment of carbonaceous substances poor in hydrogen.

3. A process as claimed in claim 1 in which the hydrocarbon containing more than 15 grams of hydrogen per 100 grams of carbon is a product of a catalytic reduction of carbon monoxide with hydrogen.

4. A process as claimed in claim 1 in which the activity of the initially highly active catalyst has been reduced by a pressure hydrogenation of a hydrocarbon oil poor in hydrogen under a total pressure of at least about 200 atmospheres and an oil-vapor partial pressure of more than 10 atmospheres.

MATHIAS PIER.
WALTER SIMON.